Figure 1:
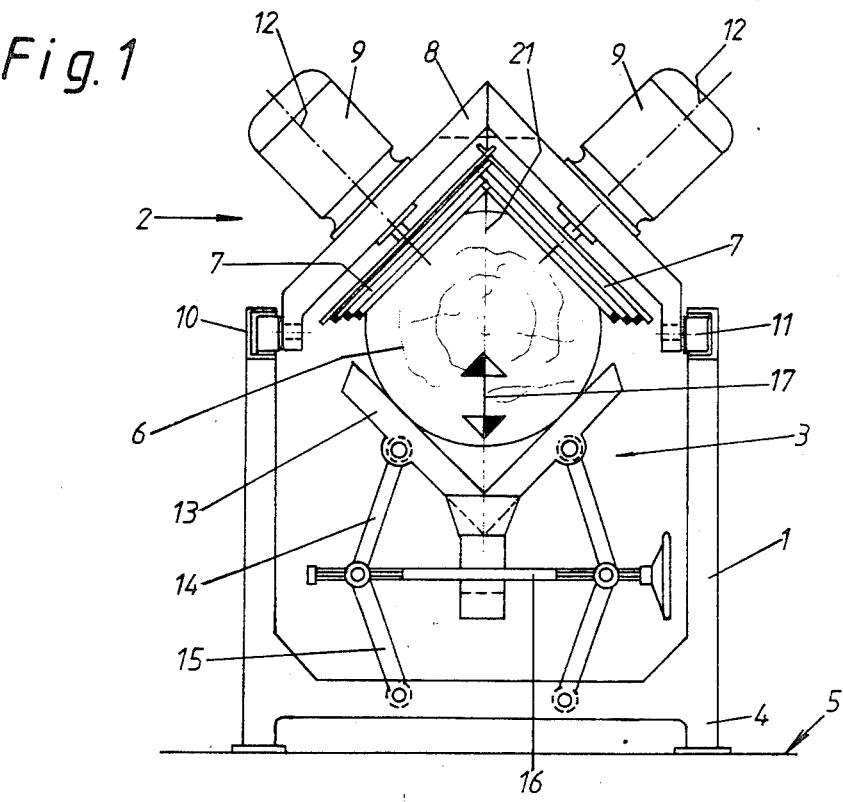

United States Patent [19]

Wolf

[11] Patent Number: 4,794,964
[45] Date of Patent: Jan. 3, 1989

[54] METHOD AND APPARATUS FOR EDGING BOLES

[76] Inventor: Johann Wolf, Muhldorf 86, A-4644 Scharnstein, Austria

[21] Appl. No.: 908,819

[22] Filed: Sep. 18, 1986

[30] Foreign Application Priority Data

Sep. 30, 1985 [AT] Austria .................................. 2828/85

[51] Int. Cl.⁴ .............................................. B27B 1/00
[52] U.S. Cl. ..................................... 144/378; 83/485; 83/496; 144/39; 144/176; 144/376; 269/13; 269/112
[58] Field of Search ...................... 83/466, 465, 471.2, 83/471.1, 496, 498, 500, 508.3; 144/39, 41, 162 R, 118, 176, 220, 376, 378; 269/13, 14, 112

[56] References Cited

U.S. PATENT DOCUMENTS 2,800,932  7/1957  Scott ....................................... 83/485
3,552,457  1/1971  Bos ....................................... 144/378

FOREIGN PATENT DOCUMENTS 779721  3/1968  Canada ................................. 144/39

*Primary Examiner*—W. Donald Bray
*Attorney, Agent, or Firm*—Young & Thompson

[57] ABSTRACT

In a method for the manufacture of prismatic or truncated-pyramid-shaped beams, it is suggested to produce respectively two adjoining, mutually perpendicularly disposed lateral faces in one working step by simultaneous edging. In an apparatus for performing the method of this invention, a machining tool (2) with two sawing or cutting tools (7, 18) is provided, these last-mentioned tools forming a right angle with each other and being arranged offset with respect to each other in the direction of the longitudinal extension of the bole (6) to be edged.

8 Claims, 2 Drawing Sheets

METHOD AND APPARATUS FOR EDGING BOLES

The invention relates to a method for the edging of boles in order to obtain prismatic or truncated-pyramid-shaped beams. Such beams can be joined into girders by means of nailing plates or threaded connections.

Conventional installations for the edging of tree trunks operate in such a way that edging is carried out on respectively one side or two mutually opposed side in parallel to each other. After clamping the bole in place four times or twice, all four sides of the bole have been edged, and the prismatic beam is finished. The production of a beam having the shape of a truncated pyramid, edged, for example., in the manner of the natural, conical configuration of a tree trunk, can be executed in this way only in a very cumbersome fashion. Each side of the bole must be subjected, in correspondence with the conicity, to individual alignment, clamping, and edging; in this connection, it is especially difficult to obtain at least partially identical beam thicknesses, with the low cutting waste to be observed as desirable.

Saw blades, cutter tools, or planer tools can be utilized as the edging tools. The decisive factor here resides in whether the cutting waste material is to be present for further use in one piece or in chips. Feeding of the boles to the tools usually takes place on a sled or carriage on which the boles are clamped in place, the tools being stationary. Installations are also known wherein the tools are moved with respect to fixed boles.

As described above, the conventional devices make it impossible, or make it feasible in an only very cumbersome fashion, to process boles in accordance with their natural, conical shape, with minimum cutting waste, into optimum beam material in the form of beams having the configuration of a truncated pyramid.

It is an object of the invention to provide a method for the production of beams having a prismatic shape or the shape of a truncated pyramid from boles by multiple-face, especially four-face edging of the boles, making it possible in two working steps to perform all-around edging of boles into prismatic or truncated-pyramid-shaped beams.

This object has been attained according to this invention by producing, in one operating step, respectively two lateral faces forming essentially a right angle with each other, i.e. mutually adjoining, by simultaneous edging of the beam lying in a holder.

With the use of the process of this invention, the bole is finished with respect to edging after two working steps, it being necessary to change the clamping fixation of the bole only once, instead of three times as heretofore. The mode of operation as proposed by this invention also achieves the objective that two adjoining lateral faces form with each other exactly the desired angle (normally 90°) since this angle is determined by the relative position of the two simultaneously effective edging tools, this position being predetermined by the machine installation.

The procedure in the method of this invention can be to edge the bole, supported from the bottom, in each of the two working steps at its upper zone lying oppositely to the supported region. Alternatively, there is the possibility of supporting the bole laterally from below and edging the bole in each of the two working steps with production of an essentially horizontal lateral face and a vertical lateral face. Both versions permit simple working since the bole which is provided during the first edging process (first working step) with two "side faces" is then automatically aligned into the correct rotational position for the second working step due to being supported by way of these side faces.

The invention also relates to an apparatus for performing the process, with a holder for the bole to be machined and with a machining tool, such as a saw, cutter, planer, or the like, a relative motion being executable between the bole and the machining tool; the invention furthermore has as its object to make available an apparatus for the edging of boles which has a simple structure and works reliably, making it possible to perform the method of this invention.

This object has been attained by providing that the machining tool consists of two sawing or cutting tools forming a right angle with each other, these tools being arranged preferably at a spacing from each other, based on the longitudinal extension of the bole, and that essentially bifurcate mounts are provided as holder means for the bole to be edged, these mounts being adjustable preferably transversely to the longitudinal extension of the bole.

The tools are mounted in the apparatus of this invention at a right angle to each other with a minimum longitudinal spacing so that the working surfaces at the apex of the angle at least contact each other or overlap. After the first working step, the bole is turned by 180° and again clamped into the holder with the two surfaces that have been machined at a right angle and now result in a planar contact. During the subsequent, second working step, the two remaining faces of the bole are edged. The possibility of adjusting the holder in conjunction with the right-angled tool arrangement permits selectively a cut of the beams that is prismatic or conical (having the shape of a truncated pyramid).

In this connection, it is initially of no importance for the apparatus as well as the procedure of this invention whether the bole is moved on a sled or cart movable in a guide means with respect to a fixed machining tool, or whether, conversely, the bole is held on a fixed mounting and the machining tool travels along the bole in a guide means.

The machining tools can exhibit circular saw blades or truncated-cone-shaped cutter heads or the like. Here again, as mentioned above, the choice of tools depends on the further usage of the cutting waste.

Figure 2:
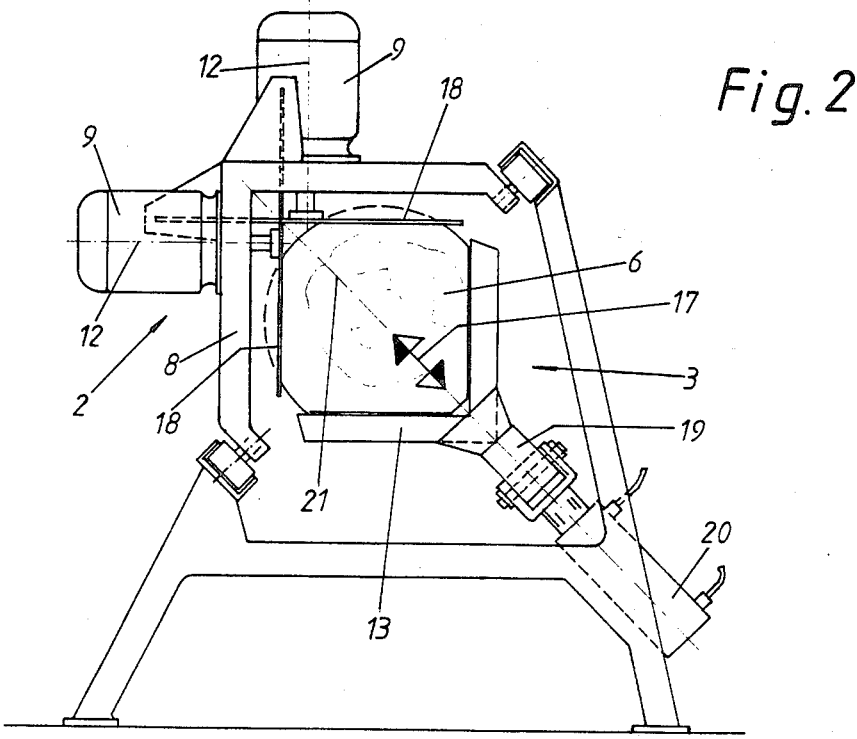
Figure 3:
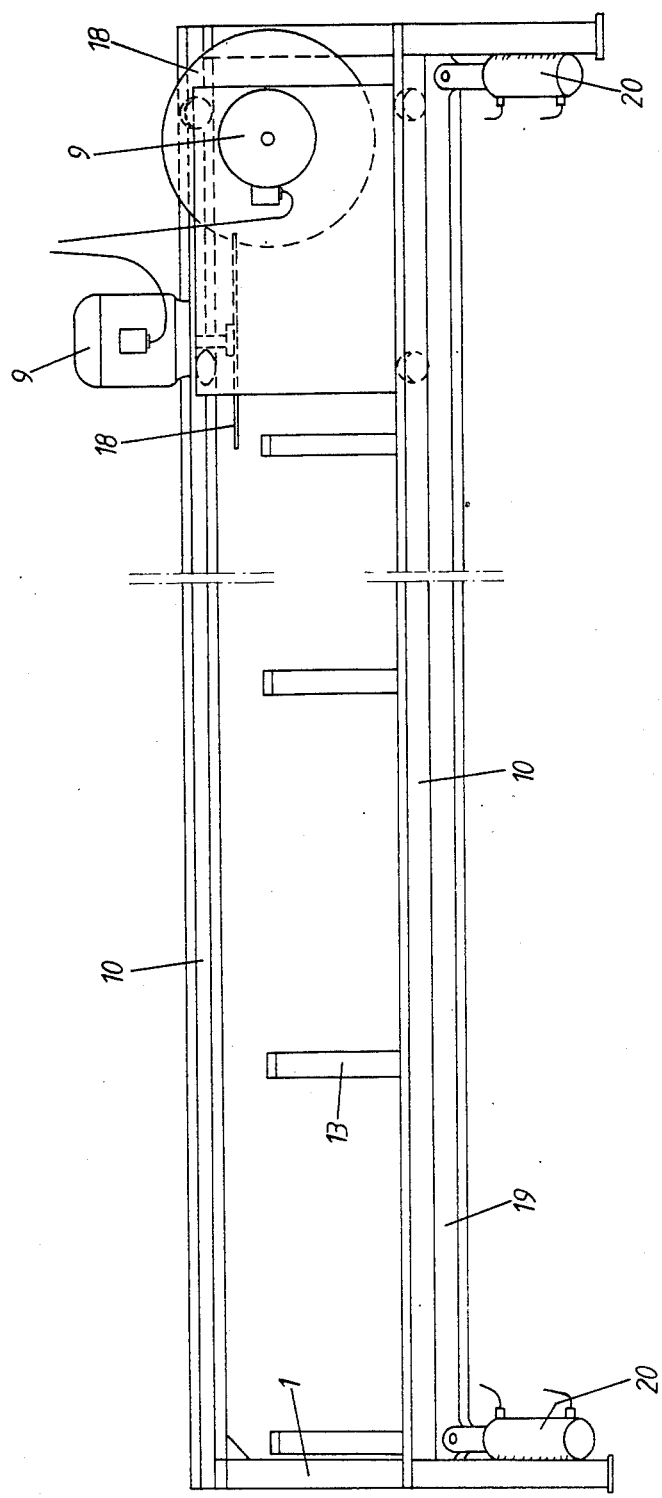

Examples for the invention are illustrated, in part schematically, in the drawings wherein:

FIG. 1 shows an end view of a first embodiment of the apparatus of this invention, FIG. 2 shows an end view of a second embodiment of the apparatus according to the invention, and FIG. 3 shows the embodiment of FIG. 2 in a side view.

The apparatus of this invention illustrated in FIG. 1 comprises a rack 1 placed on the ground 5 by means of feet 4, a machining tool 2, and a holder 3 for the boles 6 to be edged.

The machining tool 2, in the embodiment shown in FIG. 1, includes two cutter heads 7 having the shape of a truncated cone and being supported in a carriage 8 and being drivable by separate motors 9. The carriage 8 is movable in the rack 1 by way of casters 11 received in longitudinally extending rails 10, in the longitudinal direction of the bole 6 to be edged. The shifting of the carriage 8 and thus of the two cutter heads 7, which latter revolve about axes 12 that are mutually perpendicular, takes place by means of conventional means not illustrated in detail, such as, for example, a rope pulley or a chain hoist, or by way of an endless roller chain installed in one of the guide rails 10, a driven chain wheel engaging into this chain.

It can also be seen from FIG. 1 that the effective width areas, extending transversely to the longitudinal extension of the bole 6, of the sawing and/or cutting tools of the machining tool 2, here fashioned as cutter heads 7, are in contact with each other. It is understood that, as also shown in FIG. 3, the sawing or cutting tools (e.g. the cutter heads 7) are arranged mutually offset to each other in the longitudinal direction of the apparatus, i.e. in the longitudinal direction of the bole 6 or, respectively, the rack 1.

The holder 3 for the bole 6 in the rack 1 of the apparatus according to this invention comprises bifurcate mounts 13 designed essentially to be rectangular, these mounts being supported in the rack 1 by way of guide arms 14, 15 and being vertically adjustable by means of a spindle 16 (double arrow 17).

Several mounts 13, adjustable vertically independently of one another with the aid of the asociated spindles 16, are provided in the apparatus of this invention, though this is not illustrated in FIG. 1.

In the embodiment of an apparatus of this invention shown in FIGS. 2 and 3, the machining tool 2 provided therein exhibits two circular saw blades 18 driven about mutually perpendicular axes 12 by means of drive motors 9. Also in the embodiment shown in FIG. 2, the sawing or cutting tools of the machining tool 2, which former tools are designed here as circular saw blades 18, are arranged to be mutually offset in the longitudinal direction of the apparatus (compare FIG. 3), there being a maximally small spacing between the axes 12.

Shifting of the carriage 8 can take place in the embodiment illustrated in FIG. 2 in the same way as described in connection with FIG. 1.

For supporting the bole 6 to be edged, mounts 13 forming a holder 3 are also provided in the embodiment of the apparatus of this invention depicted in FIG. 2; in this case, one leg of the mount 13 is aligned horizontally, and the other leg is aligned vertically, and the bifurcate mounts 13 are attached to a support 19 common to all of them. The support 19 can be adjusted in the direction of double arrow 17 of FIG. 2 with the aid of pressure medium cylinders 20 in order to correctly align the bole lying on the holder 3 with respect to the circular saw blades 18, i.e. the machining tool 2.

A comparison of FIGS. 1 and 2 shows that they differ primarily by the feature that the angle-bisecting line 21 between the two sawing or cutting tools extends vertically in FIG. 1 whereas it is oriented in the arrangement shown in FIG. 2 at an angle of, for example, 45° with respect to the horizontal. Correspondingly, the axes 12 of the cutter heads 7 in the embodiment illustrated in FIG. 1 are inclined with respect to the horizontal at an angle of 45° whereas the axes 12 of the circular saw blades 18 in the embodiment depicted in FIG. 2 are aligned vertically and, respectively, horizontally.

It can be seen that it is possible by means of the apparatuses of this invention to manufacture prismatic as well as truncated-cone-shaped beams. For producing prismatic beams, the holder 3, i.e. its plane defined by its supports 13, is adjusted to be exactly in parallel to the displacement direction of the carriage 8 of the machining tool 2. In contrast thereto, if it is intended to manufacture beams adapted to the natural growth configuration of tree trunks 6 which are conical (having the shape of a truncated pyramid), then the plane defined by the supports 13 of the holder 3 is adjusted to be inclined with respect to the direction of movement of the machining tool 2 predetermined by the rails 10. This is possible in an especially simple way in case of the embodiment illustrated in FIGS. 2 and 3. It is understood that, in the embodiment shown in FIGS. 2 and 3, it is possible to provide also other adjusting means, such as spindles or the like, in place of the pressure medium cylinders 20.

In order to facilitate extraction of the finished bole, i.e. the prismatic or truncated-pyramid-shaped beam, from the apparatus of this invention, the holder 3 can also be tiltable in order to be able to eject the beam transversely to the longitudinal extension of the apparatus. This tilting feature can be realized by making the bifurcate mounts 13 or also merely one leg thereof to be swingable in the downward direction.

I claim:

1. A three-step method for the manufacture of beams of truncated pyramidal cross section enclosed by four flat sides that are perpendicular to each other but spaced apart, comprising positioning a bole on a support, forming two said sides at right angles to each other simultaneously, turning the bole 180° on the support, and forming the other two sides simultaneously.

2. A method as claimed in claim 1, in which said simultaneously formed sides are inclined at opposite angles of 45° to the horizontal during the formation thereof.

3. A method as claimed in claim 1, in which said simultaneously formed sides are respectively vertical and horizontal during the formation thereof.

4. Apparatus for the manufacture of beams from boles, comprising a holder on which a said bole rests stationary, said holder having stationary bole-supporting surfaces disposed at right angles to each other, a pair of tools having working faces for forming on a bole flat surfaces disposed at right angles to each other, said working faces being respectively parallel to said supporting surfaces, means for moving said tools and said holder toward and away from each other, means mounting said pair of tools on a common support, and means mounting said support for horizontal movement relative to said holder in a direction parallel to the length of a said bole on said holder.

5. Apparatus as claimed in claim 4, said working faces overlapping each other when viewed in a direction lengthwise of the bole.

6. Apparatus as claimed in claim 4, said supporting surfaces being disposed at 45° to the horizontal.

7. Apparatus as claimed in claim 4, and means for mounting said holder for vertical movement, said mounting means comprising a reversely screw-threaded spindle engaged with toggle linkage on which said holder is mounted.

8. Apparatus as claimed in claim 4, and pressure medium cylinders for moving said holder toward and away from said tools.

* * * * *